US012609250B2

(12) United States Patent
     D et al.

(10) Patent No.: US 12,609,250 B2
(45) Date of Patent: Apr. 21, 2026

(54) HYBRID ELECTROCHEMICAL CELL AND A METHOD OF PRODUCING THEREOF

(71) Applicant: Crimen Tech Private Limited, Thiruvananthapuram (IN)

(72) Inventors: Hari Krishnan D, Trivandrum (IN); Satheesh Kumar R, Thiruvananthapuram (IN); Bharat S I, Trivandrum (IN); Gokul G S, Trivandrum (IN)

(73) Assignee: Crimen Tech Private Limited, Thiruvananthapuram (IN)

( * ) Notice: Subject to any disclaimer, the term of this patent is extended or adjusted under 35 U.S.C. 154(b) by 0 days.

(21) Appl. No.: 19/066,070

(22) Filed: Feb. 27, 2025

(65) Prior Publication Data

US 2025/0201492 A1      Jun. 19, 2025

Related U.S. Application Data

(63) Continuation-in-part of application No. 18/734,691, filed on Jun. 5, 2024, now Pat. No. 12,400,805.

(30) Foreign Application Priority Data

Apr. 22, 2024    (IN) ............................. 202441031822

(51) Int. Cl.
     *H01G 11/28*      (2013.01)
     *H01G 11/24*      (2013.01)
     *H01G 11/34*      (2013.01)
     *H01G 11/52*      (2013.01)
     *H01G 11/60*      (2013.01)
     *H01G 11/62*      (2013.01)
     *H01G 11/64*      (2013.01)
     *H01G 11/84*      (2013.01)

(52) U.S. Cl.
     CPC ............. *H01G 11/28* (2013.01); *H01G 11/24* (2013.01); *H01G 11/34* (2013.01); *H01G 11/52* (2013.01); *H01G 11/60* (2013.01); *H01G 11/62* (2013.01); *H01G 11/64* (2013.01); *H01G 11/84* (2013.01)

(58) Field of Classification Search
     CPC ........ H01G 11/28; H01G 11/24; H01G 11/34; H01G 11/52; H01G 11/60; H01G 11/62; H01G 11/64; H01G 11/84
     See application file for complete search history.

(56) References Cited

U.S. PATENT DOCUMENTS

| | | | |
|---|---|---|---|
| 2021/0249695 A1* | 8/2021 | Aranami | ............... H01M 4/131 |
| 2023/0387475 A1* | 11/2023 | Ilangovan | .............. H01G 11/06 |
| 2024/0038996 A1* | 2/2024 | Kong | .................. H01M 4/0404 |

* cited by examiner

*Primary Examiner* — Daniel S Gatewood
(74) *Attorney, Agent, or Firm* — S.J. INTELLECTUAL PROPERTY LTD.

(57)      ABSTRACT

An electrochemical cell comprising a cathode, an anode, a porous separator, and an electrolyte solution is disclosed. The cathode includes a cathode current collector, wherein its first side is coated with a first composite active layer, and its second side is coated with a hybrid active layer. The anode comprises an anode current collector, wherein its first side is coated with a second composite active layer, and its second side is coated with a third composite active layer. A porous separator is positioned between the second side of the cathode and the second side of the anode, allowing the electrolyte solution to flow through. This configuration enhances energy density, power density, and cycling performance, making the cell suitable for high-performance energy storage applications.

10 Claims, 10 Drawing Sheets

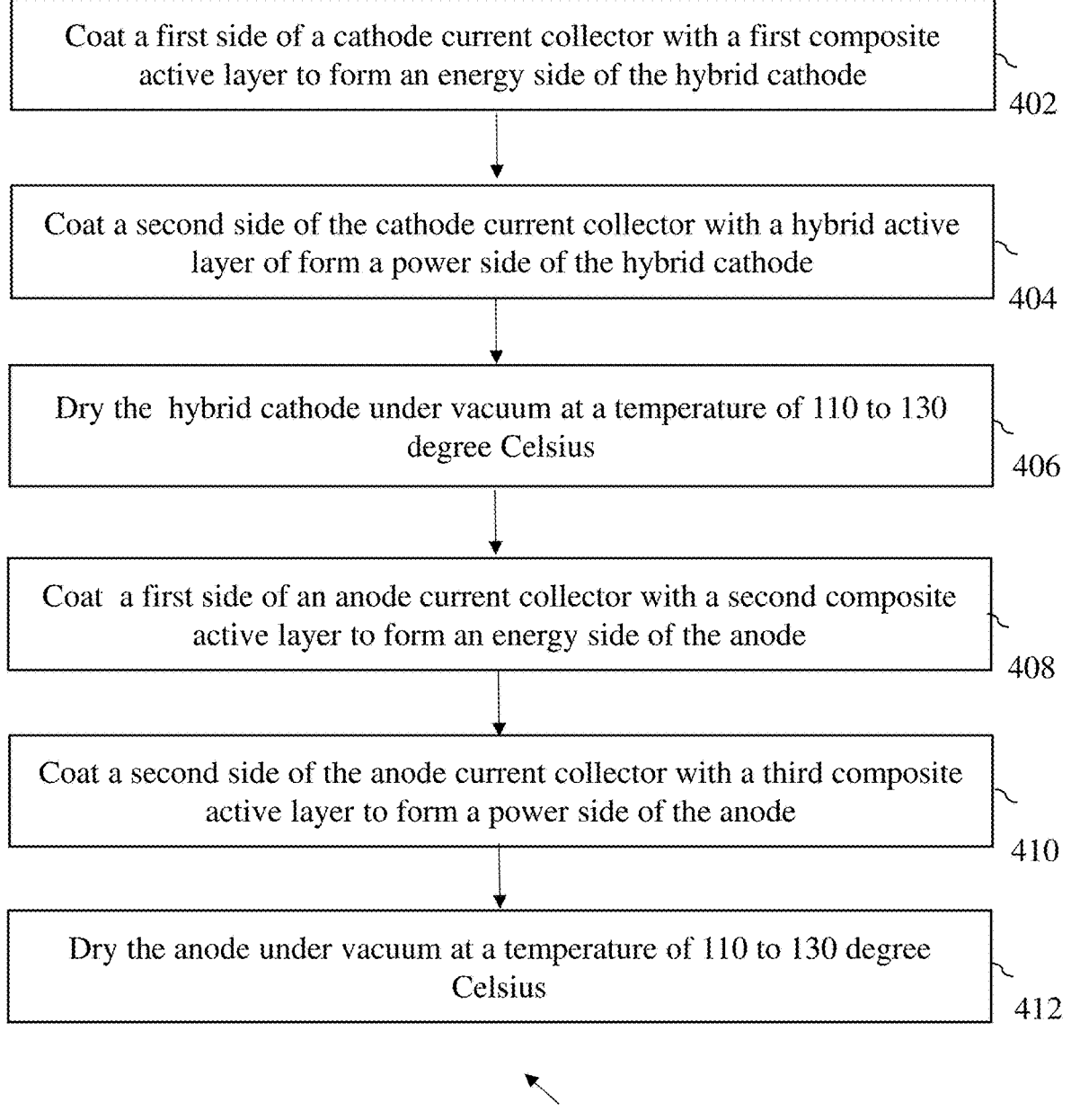

Coat a first side of a cathode current collector with a first composite active layer to form an energy side of the hybrid cathode 402

Coat a second side of the cathode current collector with a hybrid active layer of form a power side of the hybrid cathode 404

Dry the hybrid cathode under vacuum at a temperature of 110 to 130 degree Celsius 406

Coat a first side of an anode current collector with a second composite active layer to form an energy side of the anode 408

Coat a second side of the anode current collector with a third composite active layer to form a power side of the anode 410

Dry the anode under vacuum at a temperature of 110 to 130 degree Celsius 412

Form a stack of the hybrid cathode, a first separator, and the anode in a sequential configuration

414

Wind the stack into a cylindrical roll and placing in a cell case having a diameter of 21mm

416

Soak the stack in an electrolyte solution containing 1 to 1.2M lithium salt in a carbonate solvent with one or more predefined additives

418

400

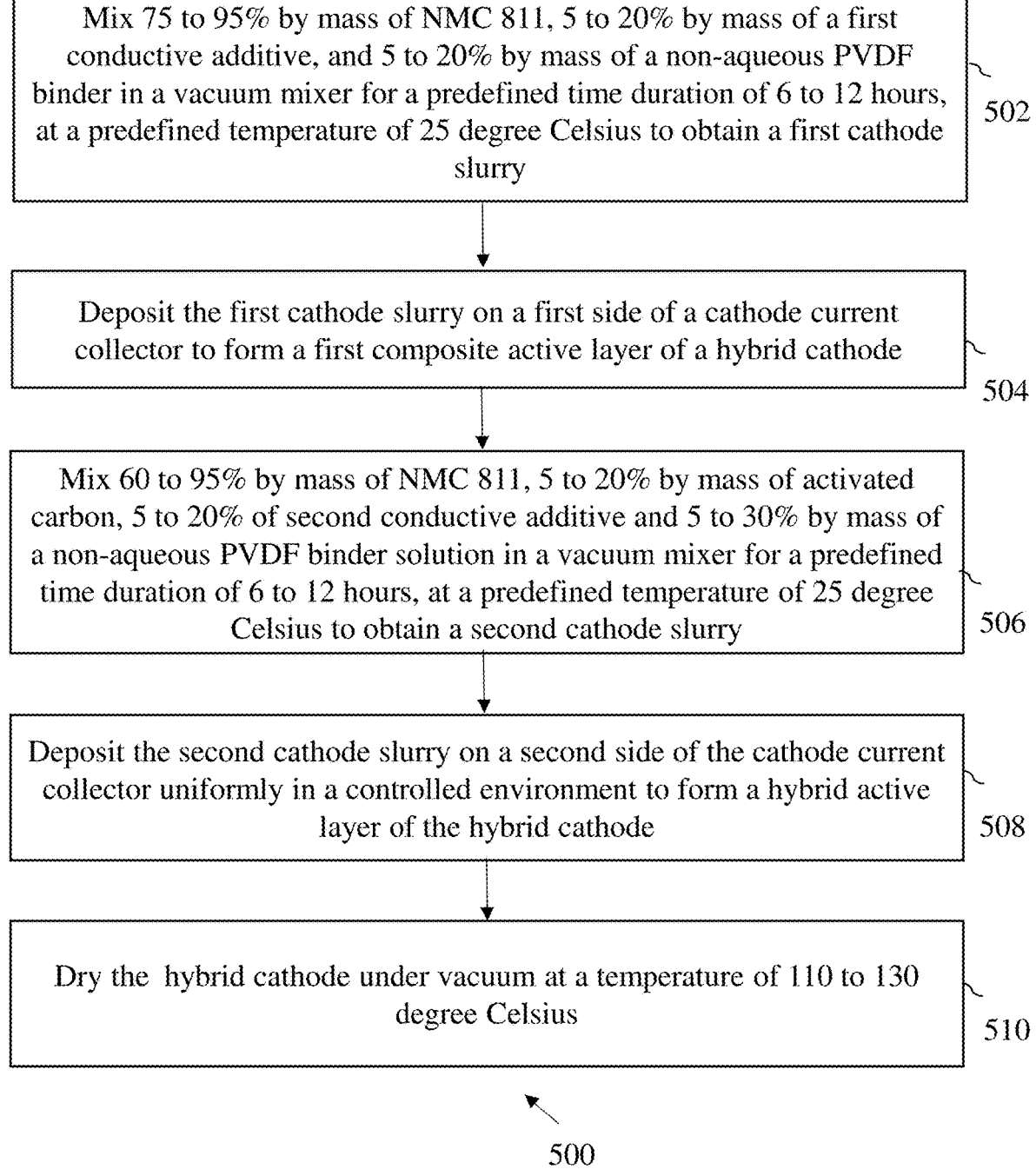

Mix 75 to 95% by mass of NMC 811, 5 to 20% by mass of a first conductive additive, and 5 to 20% by mass of a non-aqueous PVDF binder in a vacuum mixer for a predefined time duration of 6 to 12 hours, at a predefined temperature of 25 degree Celsius to obtain a first cathode slurry ⎫ 502

Deposit the first cathode slurry on a first side of a cathode current collector to form a first composite active layer of a hybrid cathode ⎫ 504

Mix 60 to 95% by mass of NMC 811, 5 to 20% by mass of activated carbon, 5 to 20% of second conductive additive and 5 to 30% by mass of a non-aqueous PVDF binder solution in a vacuum mixer for a predefined time duration of 6 to 12 hours, at a predefined temperature of 25 degree Celsius to obtain a second cathode slurry ⎫ 506

Deposit the second cathode slurry on a second side of the cathode current collector uniformly in a controlled environment to form a hybrid active layer of the hybrid cathode ⎫ 508

Dry the hybrid cathode under vacuum at a temperature of 110 to 130 degree Celsius ⎫ 510

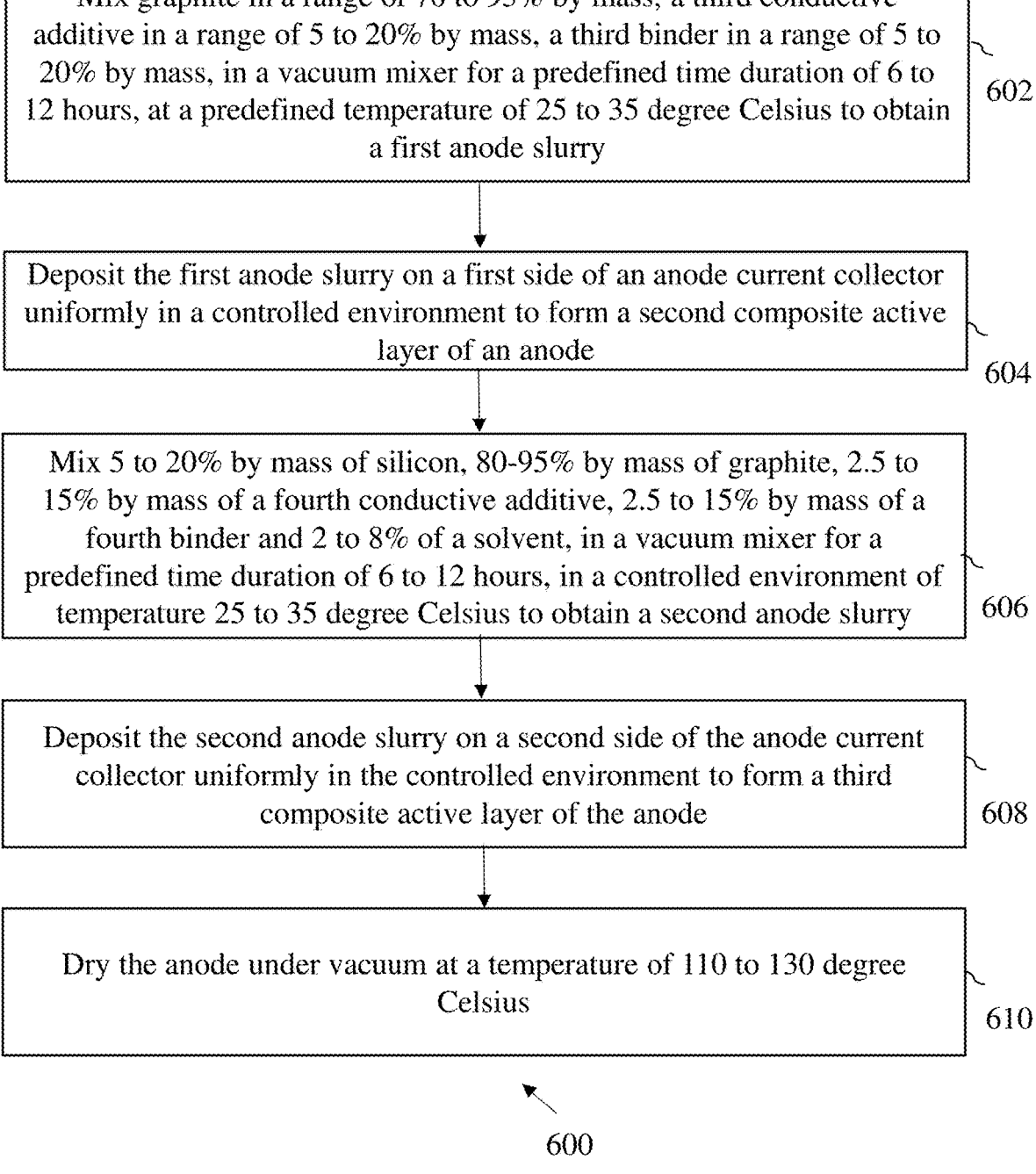

Mix graphite in a range of 70 to 95% by mass, a third conductive additive in a range of 5 to 20% by mass, a third binder in a range of 5 to 20% by mass, in a vacuum mixer for a predefined time duration of 6 to 12 hours, at a predefined temperature of 25 to 35 degree Celsius to obtain a first anode slurry ⎤ 602

Deposit the first anode slurry on a first side of an anode current collector uniformly in a controlled environment to form a second composite active layer of an anode ⎤ 604

Mix 5 to 20% by mass of silicon, 80-95% by mass of graphite, 2.5 to 15% by mass of a fourth conductive additive, 2.5 to 15% by mass of a fourth binder and 2 to 8% of a solvent, in a vacuum mixer for a predefined time duration of 6 to 12 hours, in a controlled environment of temperature 25 to 35 degree Celsius to obtain a second anode slurry ⎤ 606

Deposit the second anode slurry on a second side of the anode current collector uniformly in the controlled environment to form a third composite active layer of the anode ⎤ 608

Dry the anode under vacuum at a temperature of 110 to 130 degree Celsius ⎤ 610

HYBRID ELECTROCHEMICAL CELL AND A METHOD OF PRODUCING THEREOF

REFERENCE TO RELATED APPLICATION

This application is a continuation-in-part to U.S. application Ser. No. 18/734,691, titled ELECTROCHEMICAL ENERGY STORAGE SYSTEM filed on 6 May 2024, and claims priority from Indian Patent Application No. 202441031822 filed on 22 Apr. 2024, with inventors Bharath S I, Gokul G S, Hari Krishnan D, and Satheesh Kumar R, the contents of which are incorporated herein by reference.

FIELD

The present disclosure relates generally to the manufacturing of electrochemical cells. More particularly the present disclosure relates to manufacturing a hybrid cathode and anode for a hybrid electrochemical cell.

BACKGROUND

The present invention pertains to the field of hybrid electrochemical energy storage systems, specifically hybrid electrochemical cells that integrate faradaic and capacitive characteristics. This integration results in a system with enhanced performance metrics, including high power density, superior energy density, and extended cycle life. The invention also relates to a method for manufacturing such cells efficiently and at a scale suitable for commercial applications.

Recent advancements in energy storage technology have led to the widespread adoption of secondary batteries, such as lithium-ion batteries, which are renowned for their high energy density. These batteries have become indispensable in applications requiring long-term energy storage, such as electric vehicles and portable electronic devices. However, conventional battery technologies often encounter significant limitations in power density, making them less effective for applications that demand rapid energy delivery or high pulse performance.

Energy storage systems are generally evaluated based on two critical parameters: energy density and power density. Energy density measures the amount of energy a system can store relative to its volume or mass, while power density reflects the system's ability to deliver energy quickly. Although lithium-based batteries excel in energy density, their power density is constrained by slow faradaic reactions, which limit their responsiveness during rapid discharge or high pulse demands. Furthermore, high discharge rates often lead to capacity degradation, reduced cycle life, and inefficiencies in energy regeneration during real-world scenarios such as vehicle braking or deceleration.

To address these challenges, hybrid energy storage systems have emerged, combining the benefits of redox-active materials (faradaic) with electrostatic capacitive materials. These systems aim to achieve a balance between energy density and power density, leveraging the complementary characteristics of their constituent materials.

Prior art, such as U.S. Pat. No. 10,693,176 B2, has explored hybrid electrodes for lithium-ion cells. This patent focuses on configurations of hybrid anodes and cathodes comprising capacitor materials and traditional battery materials. However, it lacks detailed guidance on scalable fabrication methods, leading to prototypes with limited cycle life and performance issues such as short-circuiting. Similarly, Indian Patent Application IN202041043817 introduces hybrid cathodes but sacrifices energy density for power enhancement. These approaches have yet to achieve the ideal combination of high energy density, power density, and cycle life in a commercially viable single-pair electrode configuration.

Additionally, existing technologies struggle with efficiently harnessing reverse currents generated during practical applications, such as vehicle braking. Due to the slow kinetics of conventional battery systems, this reverse current cannot be fully utilized, resulting in capacity loss and shortened cycle life. Current solutions also fail to provide consistent high pulse discharge performance, which is critical for applications requiring quick bursts of energy.

This underscores the need for a novel hybrid electrochemical cell that integrates advanced materials capable of delivering high power density, energy density, and long cycle life.

Hence, an alternative hybrid electrochemical cell having an improved hybrid electrode and anode that provides improved energy density and power enhancement is proposed. The hybrid electrochemical cell must also incorporate a commercially viable fabrication method to facilitate large-scale production. Disclosed solution addresses the limitations of current technologies while enabling efficient energy regeneration and high-performance operation across diverse applications.

SUMMARY

The following summary is illustrative only and is not intended to be in any way limiting. In addition to the illustrative aspects, example embodiments, and features described, further aspects, example embodiments, and features, will become apparent by reference to the drawings and the following detailed description.

The present disclosure describes a hybrid electrochemical cell, also referred to as electrochemical cell or cell, designed to enhance performance, durability, and energy efficiency. The electrochemical cell features a cathode comprising a cathode current collector, where one side is coated with a first composite active layer, and the other side is coated with a hybrid active layer. The anode of the cell similarly includes an anode current collector, with its first side coated with a second composite active layer and the opposite side coated with a third composite active layer. Positioned between the cathode and the anode is a porous separator that allows the flow of an electrolyte solution, ensuring ionic conductivity while preventing direct contact between the electrodes.

In an enhanced configuration, the cell includes an additional porous separator adjacent to either the first side of the cathode or the second side of the anode. Both the primary porous separator and the second separator can be made from materials such as polypropylene (PP), polyethylene (PE), or a tri layer structure of PP and PE. These separators play a crucial role in maintaining the structural integrity and operational safety of the cell.

The active layers on the cathode are specifically engineered to optimize the cell's electrochemical performance. The first composite active layer comprises a cathode electroactive material in the range of 75-96% by mass, a first conductive additive in the range of 5-20% by mass, and a first non-aqueous binder in the range of 5-20% by mass. The hybrid active layer on the cathode integrates a cathode electroactive material in the range of 60-95% by mass, a cathode capacitive material in the range of 5-20% by mass, a second conductive additive in the range of 5-20% by mass, and a second non-aqueous binder in the range of 5-30% by mass. The cathode electroactive material encompasses a wide variety of advanced lithium-based compounds, including nickel-manganese-cobalt oxide (NMC) variants, lithium nickel cobalt aluminium oxide (NCA), lithium manganese iron phosphate (LMFP), lithium ferro phosphate (LFP), Lithium Manganese Nickel Oxide (LMNO), and other high-performance lithium compositions. These materials are selected for their superior electrochemical properties, enabling the cell to achieve a high energy density.

The hybrid active layer further incorporates a capacitive material, such as activated carbon, to provide supercapacitor-like characteristics, enhancing power density and charge-discharge efficiency, wherein the selection of the supercapacitive material is tailored to optimize either power output or energy storage capacity depending on the specific performance requirements. The capacitive material may include, but is not limited to, supercapacitive materials such as electric double-layer capacitor (EDLC) materials and pseudocapacitive metal oxides, conducting polymers, or other materials exhibiting supercapacitor-like behavior. electric double-layer capacitor (EDLC) materials, such as activated carbon, carbon nanotubes (CNTs), graphene, and carbon aerogels, primarily function by electrostatic charge storage, effectively increasing power density due to their rapid charge-discharge capability. Additionally, pseudocapacitor materials including Manganese dioxide ($MnO_2$), Ruthenium dioxide ($RuO_2$), Nickel hydroxide ($Ni(OH)_2$), Polyaniline (PANI), Polypyrrole (PPy), Vanadium pentoxide ($V_2O_5$), Iron(III) oxide ($Fe_2O_3$), Cobalt(II,III) oxide ($CO_3O_4$), various conducting polymers, and Titanium nitride (TiN) can be integrated. These pseudocapacitor materials introduce fast, reversible redox reactions, thereby increasing both power density and energy storage capacity. Further, the pseudocapacitor materials contribute to improving the capacitance and energy storage capabilities of the system, enabling faster charging times and higher power outputs suitable for demanding energy applications. The conductive additives, which include materials like conductive carbon, carbon nanotubes (CNTs), carbon nanofibers (CNFs), and ketjen black, ensure effective electron transport within the active layers. Importantly, the first and second conductive additives differ to optimize the functionality of each layer. The non-aqueous binders, such as Polyvinylidene Fluoride (PVDF), acrylonitrile-based binders, and polyethylene oxide (PEO), provide mechanical stability and compatibility with the electrolyte.

The electrochemical cell described incorporates a second composite active layer comprising graphite as an anode electroactive material in a range of 70% to 95% by mass, along with a third conductive additive and a third binder, each in the range of 5% to 20% by mass. Additionally, a third composite active layer features two anode electroactive materials silicon (5% to 20% by mass) and graphite (80% to 95% by mass) as well as a fourth conductive additive (2.5% to 15% by mass), a fourth binder (2.5% to 15% by mass), and a solvent (2% to 8% by mass). The third and fourth conductive additives include options such as conductive carbon, SuperP, blended carbon, graphene, carbon fibres, carbon nanotubes (CNTs), carbon nanofibers (CNFs), porous carbon, ketjen black, and carbon mixtures. The third binder utilizes one or more non-aqueous binders, such as Polyvinylidene Fluoride (PVDF) binder solution, Acrylonitrile-based binders, Polyethylene Oxide (PEO), and 5130 solvate, dissolved in N-Methyl-2-pyrrolidone (NMP) solvent at a concentration of 45% to 55% by weight to form a uniform binder solution. The fourth binder employs aqueous binders like Carboxymethyl Cellulose (CMC), Styrene- Butadiene Rubber (SBR), and Polyacrylic Acid (PAA), with the solvent being deionized water.

The cell maintains a cathode thickness ratio of 6:5 between its first and second sides, with the anode thickness ratio also at 6:5. Its electrolyte solution includes one or more lithium salts, additives, and solvents. The lithium salts can be selected from options such as lithium hexafluorophosphate (LiPF6), lithium tetrafluoroborate (LiBF4), lithium perchlorate (LiClO4), lithium hexafluoro arsenate (LiAsF6), and lithium bis(trifluoro methane) sulfonimide (LiTFSI), in a proportion of 1 to 2 moles per Litre. Additives include compounds like vinylene carbonate (VC), fluoroethylene carbonate (FEC), and vinylene carbonate phosphates or borates, while solvents range from ethylene carbonate (EC) and propylene carbonate (PC) to dimethyl carbonate (DMC), diethyl carbonate (DEC), ethyl methyl carbonate (EMC), nitrile-based solvents (e.g., Acetonitrile (AN), Adiponitrile (ADN)), ethers, lactones, sulfolanes, and their combinations.

The electrochemical cell achieves an energy density of up to 210 watt-hours per kilogram (Wh/kg), a volumetric energy density of up to 650 Watt-hours per Litre (Wh/l), and a power density of up to 3.5 kilowatts per kilogram (kW/kg). This carefully designed electrochemical cell demonstrates significant advancements in energy storage technology, achieving a lifecycle of up to 1000 cycles while balancing high energy and power density.

The method for manufacturing an electrochemical cell involves multiple steps for forming both the cathode and anode, ensuring their proper coating, and drying under controlled conditions. Initially, a hybrid cathode is formed by coating the first side of a cathode current collector with a first composite active layer to create the energy side, and the second side with a hybrid active layer for the power side. Both sides are dried under vacuum at temperatures between 110 to 130° C. Similarly, the anode is created by coating the first side of an anode current collector with a second composite active layer (for the energy side) and the second side with a third composite active layer (for the power side), followed by drying under similar conditions.

The first composite active layer of the cathode consists of NMC 811, a conductive additive, and a PVDF binder, mixed in a vacuum mixer to form a slurry with a specific viscosity. This slurry is then deposited uniformly onto the first side of the cathode current collector. The hybrid active layer on the second side of the cathode is prepared by mixing NMC 811, activated carbon, another conductive additive, and a non-aqueous PVDF binder solution to form a second slurry, which is similarly deposited in a controlled environment.

For the anode, the second composite active layer is prepared by mixing graphite, a third conductive additive, and a third binder to form an anode slurry, which is then deposited on the anode current collector. The third composite active layer is made by mixing silicon, graphite, a fourth conductive additive, a fourth binder, and a solvent, which is also deposited uniformly onto the second side of the anode current collector.

The method includes assembling the hybrid cathode, anode, and separators in a specific configuration, followed by winding the stack into a cylindrical roll and placing it into a cell case. The stack is then soaked in an electrolyte solution containing lithium salt in a carbonate solvent with pre-defined additives. The electrolyte solution is prepared by dissolving lithium hexafluorophosphate (LiPF6) in a selected solvent mixture and adding the additives, which could include vinylene carbonate or fluoroethylene carbonate.

To achieve the desired energy characteristics, the method specifies a thickness ratio of 6:5 for the hybrid cathode to the anode, and a 1:1.15 ratio for the amount of active material in the hybrid cathode to the anode. This ensures an energy density of up to 210 Wh/kg, a volumetric energy density of up to 650 Wh/L, and a power density of up to 3.5 kW/kg for the electrochemical cell.

The present invention fulfils current needs by presenting a compact, hybrid electrochemical cell with redox-capacitive synergy, optimized for both high power and energy storage applications. The invention not only offers a new approach to material integration but also proposes a continuous fabrication process to ensure scalability and commercial viability. These and other embodiments of the present disclosure are discussed in further detail hereinbelow.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein:

FIG. 5 is flowchart illustrating a method of manufacturing a hybrid cathode of the electrochemical cell, according to an example embodiment;

FIG. 6 is flowchart illustrating a method of manufacturing an anode of the electrochemical cell, according to an example embodiment;

DETAILED DESCRIPTION OF EXAMPLE EMBODIMENTS

Figure 1:
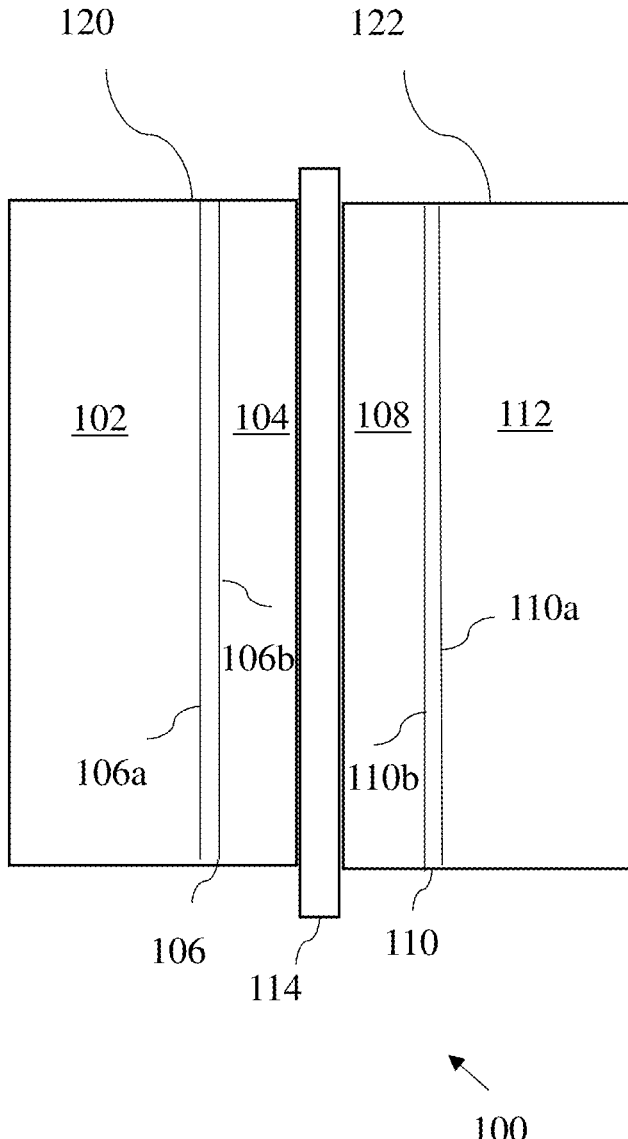
FIG. 1 illustrates a cross sectional view of an electrochemical cell, according to an example embodiment of the present invention.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Similarly, like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any, and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/of" and "at least one of" include any and all combinations of one or more of the associated listed items. It will be further understood that the terms "comprises," "comprising," "includes," and/or "including," when used herein, specify the presence of stated features, integers, steps, operations, elements, elements, and/or components, but do not preclude the presence or addition of one or more other features, integers, steps, operations, elements, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skills in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in 'addition to the orientation depicted in the figures. For example, if the device in the figures is turned over, elements described as "below", or "beneath" other elements or features would then be oriented "above" the other elements or features. Thus, term such as "below" may encompass both an orientation of above and below.

FIG. 1 illustrates a cross sectional view of an electrochemical cell 100, according to an example embodiment of the present invention. The electrochemical cell 100 includes a cathode 120, a porous separator 114, though which electrolyte 124 flows, and an anode 122.

The cathode 120 also referred to as a hybrid cathode 120 includes a cathode current collector 106 (e.g. an Aluminum foil) on which a first composite layer 102 is coated on a first side 106a. The first side 106a is also referred to as an energy side 106a, of the cathode 120, as the first composite layer 102 comprises more than 75% of active materials. The first composite layer 102 includes a cathode electroactive material in a range of 75 to 96% by mass of the first composite active layer 102, a first conductive additive in a range of 5 to 20% by mass of the first composite active layer 102, and a first non-aqueous binder in a range of 5 to 20% by mass of the first composite layer 102.

The cathode electroactive material is selected from one or more of nickel-manganese-cobalt oxide (NMC) 111, NMC 532, NMC 622, NMC 811, NMC 9 0.5 0.5, lithium nickel cobalt aluminum oxide (NCA), lithium manganese iron phosphate (LMFP), lithium ferro phosphate (LFP), lithium cobalt dioxide ($LiCO_2$), lithium nickel manganese cobalt oxide ($LiNi_xMn_yCo_{1-x-y}O_2$) (where $0 \leq x \leq 1$ and $0 \leq y \leq 1$), lithium nickel manganese aluminum oxide ($LiNi_xMn_yAl_{1-x-y}O_2$) (where $0 \leq x \leq 1$ and $0 \leq y \leq 1$), lithium nickel manganese oxide ($LiNi_xMn_{1-x}O$) (where $0 \leq x \leq 1$), lithium manganese oxide ($LiMn_2O_4$), lithium nickel manganese oxide ($LiNi_xMn_{1.5}O_4$), lithium iron phosphate ($LiFePO_4$), lithium vanadium phosphate ($LiVPO_4$), lithium vanadium phosphate ($LiV_2(PO_4)_3$), lithium titanium sulfide ($LiTiS_2$), lithium sulfide ($Li_2S$), lithium iron phosphate fluoride ($Li_2FePO_4F$), lithium iron phosphate polyphosphate ($Li_3Fe_3(PO_4)_4$), lithium vanadium phosphate fluoride ($Li_3V_2(PO_4)F_3$), and lithium iron sulfide (LiFeS).

Further, the first conductive additive comprises one or more of conductive carbon, SuperP, blended carbon, carbon fibers, carbon nanotubes (CNTs), carbon nanofibers (CNFs), porous carbon, ketjen black, and carbon mixture. Further, the first non-aqueous binder is selected from one of a non-aqueous Polyvinylidene Fluoride (PVDF) binder solution, Acrylonitrile-based binders, Polyethylene Oxide (PEO), or 5130 solvate. The first non-aqueous binder is paired with N-Methyl-2-pyrrolidone (NMP) solvent to improve the flowability of the cathode slurry that is added onto the cathode current collector.

Further, on a second side 106b of the cathode current collector 106, a hybrid active layer 104 is coated. The second side 106b is referred to as a power side 106b of the cathode 120, as it helps in improving the power density of the electrochemical cell 100. The hybrid active layer 104 comprises a composition of the cathode electroactive material in a range of 60 to 95% by mass of the hybrid active layer 104, a cathode capacitive material in a range of 5 to 20% by mass, the second conductive additive in a range of 5 to 20% by mass, and a second non-aqueous binder in a range of 5 to 30% by mass.

In an embodiment, the cathode capacitive material comprises of a super capacitive material such as activated carbon. In another embodiment, the cathode capacitive material may include, but is not limited to, electric double-layer capacitor (EDLC) materials and pseudocapacitive metal oxides, conducting polymers, or other materials exhibiting supercapacitor-like behavior. electric double-layer capacitor (EDLC) materials, such as activated carbon, carbon nanotubes (CNTs), graphene, and carbon aerogels, primarily function by electrostatic charge storage, effectively increasing power density due to their rapid charge-discharge capability. Additionally, pseudocapacitor materials including Manganese dioxide ($MnO_2$), Ruthenium dioxide ($RuO_2$), Nickel hydroxide ($Ni(OH)_2$), Polyaniline (PANI), Polypyrrole (PPy), Vanadium pentoxide ($V_2O_5$), Iron(III) oxide ($Fe_2O_3$), Cobalt(II,III) oxide ($CO_3O_4$), various conducting polymers, and Titanium nitride (TiN) can be integrated. These pseudocapacitor materials introduce fast, reversible redox reactions, thereby increasing both power density and energy storage capacity. The second conductive additive comprises one or more of conductive carbon, SuperP, blended carbon, carbon fibers, carbon nanotubes (CNTs), carbon nanofibers (CNFs), porous carbon, ketjen black, carbon mixture. Typically, in any configuration of the cathode, it is notes that the first conductive additive used in the first composite layer 102, is kept different from the second conductive additive used in the second composite layer 104. Further, the second non-aqueous binder is selected from one of a non-aqueous Polyvinylidene Fluoride (PVDF) binder solution, Acrylonitrile-based binders, Polyethylene Oxide (PEO), or 5130 solvate. The second non-aqueous binder is mixed with a N-Methyl-2-pyrrolidone (NMP) solvent having a concentration of 45 to 55%. The use of the super capacitor material like activated carbon in the first hybrid layer 104 of the cathode 120 results in a hybrid cathode 120, having a life cycle of up to 1000 cycles.

In the described electrochemical cell, the second side of the cathode current collector, referred to as the power side, plays a critical role in enhancing the power density of the cell. This is achieved through the application of a hybrid active layer on the second side of the cathode current collector. The hybrid active layer is meticulously engineered to incorporate specific materials and properties that are essential for delivering high power density.

The hybrid active layer 106b includes materials such as the activated carbon and the second conductive additive. The activated carbon is particularly advantageous due to its high surface area, which enables rapid ion adsorption and desorption processes. This characteristic makes, the activate carbon a key contributor to an ability of the cell 100 to deliver energy swiftly when there is a sudden demand for power. The inclusion of the second conductive additive, such as blended carbon, carbon nanotubes, or similar high-conductivity materials, further enhances the electron transport within the hybrid active layer 106b. The second conductive additive reduces am internal resistance of the cell 100 and facilitates a faster flow of electrons across the cathode 120, which is essential for maintaining high power output.

A role of the hybrid active layer 106b, as the power side 106b of the cathode 120 is not just in delivering power but also in complementing the energy side 106a of the cathode 120. While the energy side 106a is designed to store a large amount of energy and ensure sustained energy delivery, the power side 106b is optimized for rapid energy release. This dual functionality ensures that the electrochemical cell is capable of addressing both high-energy and high-power demands effectively.

By coating the hybrid active layer 104 on the second side 106b of the cathode current collector 106, the power density of the electrochemical cell 100 is significantly improved. Power density is a measure of how quickly energy can be delivered, and the hybrid active layer's 104 unique composition ensures that this energy is released efficiently without compromising the overall energy storage capability of the cell 100. This feature makes the cell 100 particularly suitable for applications where quick bursts of power are required, such as in electric vehicles, energy storage systems, or other high-performance applications.

In summary, the second side 106b of the cathode current collector 106, coated with the hybrid active layer 104 and functioning as the power side 106b, is integral to enhancing the power density of the electrochemical cell 100. Disclosed design optimally balances an ability of the cell 100 to store and deliver energy, enabling the cell 100 to meet the demands of modern energy storage applications.

The integration of supercapacitor material like activated carbon into the first hybrid layer 106b of the cathode 120 significantly enhances an efficiency of the cell 100 by leveraging the unique properties of both activated carbon and the second conductive additive such as blended carbon. Activated carbon introduces a high surface area within the cathode's 120 structure, which is critical for enabling a double-layer capacitance effect. This effect allows the cathode 120 to store and release energy rapidly, enhancing its ability to respond to fluctuations in power demand. Activated carbon acts as an initiator, improving ion transport and minimizing charge transfer resistance during electrochemical reactions. This enhanced ion mobility ensures more efficient energy storage and discharge, directly contributing to the hybrid cathode's performance and extending its lifecycle to up to 1000 cycles.

Simultaneously, the presence of first conductive additive and second conductive additive (e.g. carbon mixture, blended carbon) accelerates the movement of electrons within the cathode 120. By reducing internal resistance and facilitating a faster electron flow, the first conductive additive and the second conductive additive enhance the electrical conductivity of the cathode 120. This acceleration of electrons ensures that energy can be efficiently transferred during charge and discharge cycles, further boosting a power output of the cell 100. Together, activated carbon and second conductive additive work synergistically to balance the energy and power capabilities of the cathode 120, enabling it to deliver consistent performance over a prolonged period.

The design of the hybrid cathode 120 is further optimized by dividing its functionality into distinct energy side 106a and power side 106b. The energy side 106a, formed using the first composite active material, is specifically engineered to retain the energy density of the electrochemical cell 100. This energy side 106a ensures that the cell 100 can store a substantial amount of energy, supporting longer operating durations without compromising its capacity. The composition of the first composite layer 104 is tailored to maximize energy retention, ensuring that the cell 100 can deliver the required energy over extended periods.

On the other hand, the power side 106b, which consists of the hybrid active layer 104 incorporating activated carbon, is designed to enhance the power density of the cell. The hybrid active layer's 104 composition, including supercapacitor materials and conductive additives, enables the rapid delivery of energy when high power is required. This configuration ensures that the cell 100 can meet sudden power demands effectively, making it suitable for applications requiring both high energy and high power densities.

By combining these complementary functionalities within the cathode 120, the electrochemical cell achieves an optimal balance between energy retention and power delivery. The energy side 106a preserves the capacity of the cell 100, while the power side 106b ensures rapid energy discharge, resulting in a versatile and efficient energy storage of the cell 100. This innovative hybrid design not only improves the overall performance of the cathode 120 but also supports its long lifecycle, making it ideal for demanding applications in energy storage systems.

The anode 122 includes an anode current collector 110 (e.g. a Copper foil) on which a second composite active layer 112 is coated on a first side 110a, and a third composite active layer 108 is coated on a second side 110b of the anode 122.

The second composite active layer 112 includes an anode electroactive material consisting in a range of 70 to 95% by mass, a third conductive additive in a range of 5 to 20% by mass, a third binder in a range of 5 to 20% by mass of the second composite active layer. The anode electroactive material is graphite. The third conductive additive comprises one or more of conductive carbon, SuperP, blended carbon, graphene, carbon fibers, carbon nanotubes (CNTs), carbon nanofibers (CNFs), porous carbon, ketjen black, carbon mixture. The third binder comprises one or more of a non-aqueous Polyvinylidene Fluoride (PVDF) binder solution, Acrylonitrile-based binders, Polyethylene Oxide (PEO), and 5130 solvate, and wherein the one or more binders are dissolved in a N-Methyl-2-pyrrolidone (NMP) solvent at a concentration of 45 to 55% by weight to create a uniform binder solution.

The third composite active layer 108 comprises of at least two anode electroactive materials comprising silicon in range of 5 to 20% by mass, and graphite in a range of 80 to 95% by mass, a fourth conductive additive in a range of 2.5 to 15% by mass, a fourth binder in a range of 2.5 to 15% by mass, and the solvent in a range of 2 to 8% by mass of the third composite active layer.

The fourth conductive additive comprises one or more of conductive carbon, SuperP, blended carbon, graphene, carbon fibers, carbon nanotubes (CNTs), carbon nanofibers (CNFs), porous carbon, ketjen black, carbon mixture. The fourth binder comprises of an aqueous binder selected from Carboxymethyl Cellulose (CMC), Styrene-Butadiene Rubber (SBR), and Polyacrylic Acid (PAA), and the solvent is D-Ionized water.

A thickness ratio of the first side 106a of the cathode 120 to the second side 106b of the cathode 120 is designed to be 6:5. Similarly, a ratio of thickness of the first side 110a of the anode 122 to the second side 110b of the anode 122 is maintained at 6:5.

The thickness ratio of 6:5 designed for the electrochemical cell 100 is a crucial design parameter that ensures an optimal balance between energy and power performance. In the cathode 120, the first side 106a, known as the energy side, is thicker than the second side 106b, referred to as the power side. This deliberate thickness variation enhances the energy storage capabilities of the cathode 120 by allowing the energy side 106a to accommodate a larger quantity of active material, thus increasing the overall energy density of the cell 100. The thinner power side 106b, on the other hand, is tailored for rapid ion and electron transport, which facilitates quicker charge and discharge cycles. This configuration enables the cathode 120 to deliver energy at high power rates without compromising its ability to store substantial energy.

Similarly, the anode 122 follows the same thickness ratio of 6:5, with the first side 110a (energy side) being thicker than the second side 110b (power side). The energy side 110a of the anode 122 works in tandem with the energy side 110b of the cathode 122 to maximize the capacity of the cell 100 for energy storage, ensuring that the cell 100 can sustain prolonged operations or higher energy demands. Meanwhile, the thinner power side 110b of the anode 122 complements the power side 106b of the cathode 122, ensuring efficient and rapid energy release during high-demand scenarios. This design aligns the anode's 122 rapid response capability with that of the cathode 120, maintaining the overall efficiency and balance of the electrochemical cell 100.

The 6:5 thickness ratio is instrumental in achieving a harmonious balance between energy density and power density in the electrochemical cell 100. By optimizing the material distribution, the cell 100 can simultaneously store a large amount of energy and deliver it quickly when required, making it suitable for applications such as electric vehicles and energy storage systems. Furthermore, this ratio minimizes mechanical and electrochemical stresses during charge and discharge cycles, thereby enhancing a cycle life of the cell 100 and operational efficiency. This carefully engineered thickness variation reflects a comprehensive approach to designing an electrochemical cell 100 that meets the dual demands of energy storage and power delivery while ensuring long-term durability.

The electrolyte solution 124 in the electrochemical cell 100 is a critical component designed to optimize ion transport and enhance performance of the cell 100. The electrolyte solution 124 comprises one or more of a lithium salt, an additive, and a solvent, each carefully selected for its specific properties and contribution to the electrolyte's overall functionality. The lithium salt, which acts as the primary ionic conductor, can be chosen from a range of compounds, including lithium hexafluorophosphate (LiPF6), lithium tetrafluoroborate (LiBF4), lithium perchlorate (LiClO4), lithium hexafluoro arsenate (LiAsF6), and lithium bis(trifluoro methane) sulfonimide (LiTFSI). These salts are incorporated into the electrolyte solution at a concentration of 1 to 2 moles per liter, ensuring optimal ionic conductivity and stability under varying operating conditions.

To further enhance the performance and stability of the electrolyte solution 124, additives are included in the formulation. These additives, such as vinylene carbonate (VC), fluoroethylene carbonate (FEC), vinylene carbonate phosphates, and borates, play a crucial role in improving the electrochemical stability window and forming a robust solid electrolyte interphase (SEI) on the electrode surfaces. The SEI layer, facilitated by these additives, minimizes side reactions, reduces capacity fade, and extends the cycle life of the cell. Additionally, these additives help in stabilizing the electrolyte against thermal and electrochemical decomposition, especially during high voltage or temperature operation.

The solvent component of the electrolyte solution 124 provides the medium for dissolving the lithium salts and ensuring efficient ion transport. A variety of solvents can be used, including ethylene carbonate (EC), propylene carbonate (PC), dimethyl carbonate (DMC), diethyl carbonate (DEC), and ethyl methyl carbonate (EMC). Other solvent options include nitrile-based solvents like acetonitrile (AN) and adiponitrile (ADN), as well as ethers, lactones, and sulfolanes. These solvents may be used individually or in combinations to achieve the desired viscosity, dielectric constant, and thermal stability. The combination of solvents ensures a balance between low-temperature performance, high ionic conductivity, and chemical stability, tailored to the specific requirements of the electrochemical cell 100.

Together, the carefully selected lithium salt, additive, and solvent components of the electrolyte solution work in synergy to provide high ionic conductivity, stable electrochemical performance, and extended cycle life for the cell. This tailored electrolyte formulation is essential for maintaining the efficiency and reliability of advanced energy storage systems.

The porous separator 114 is sandwiched between the cathode 120 and the anode 122. The porous separator 114 is arranged between the second side 106b of the cathode 120 and the second side 110b of the anode 122. The electrolyte solution 124 flows through the porous separator 114. In an embodiment, the porous separator 114 is made of polypropylene (PP), polyethylene (PE), or a tri layered (PP, PE, PP) separator.

Figure 2:
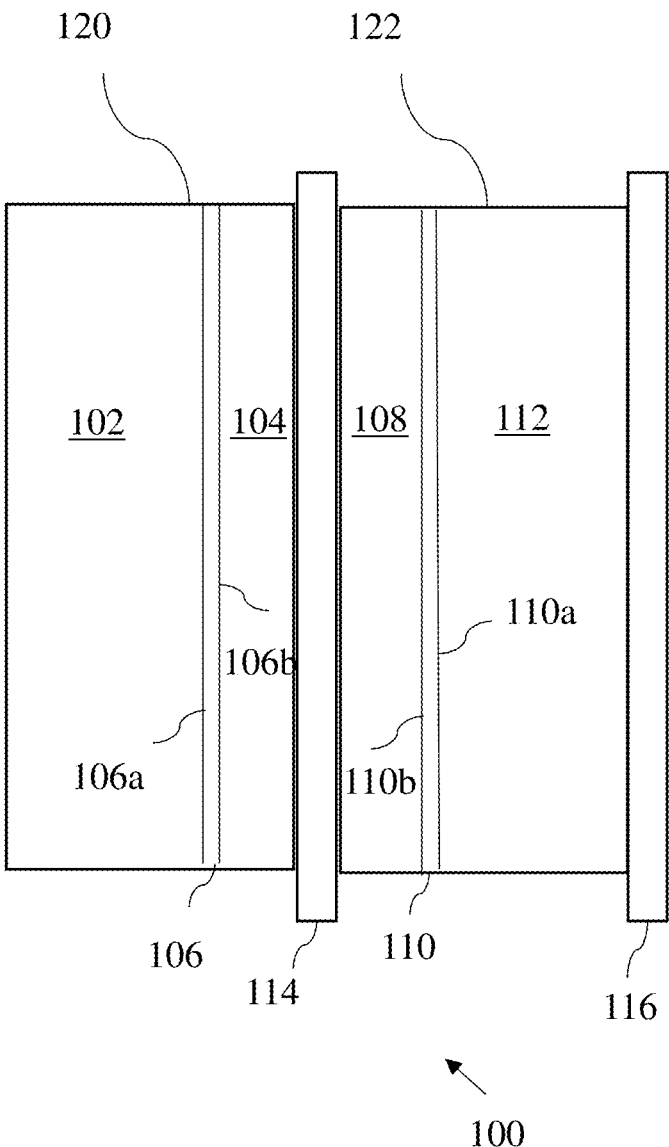
FIG. 2 illustrates a cross sectional view of an arrangement within the electrochemical cell of FIG. 1, according to an example embodiment of the present invention.

FIG. 2, discloses an arrangement 200 of the electrochemical cell 100, where a second porous separator 116 is disposed adjacent to one of the first side 110a of the anode 122. As shown, the second porous separator 116 touches the second composite layer 112 of the anode 122.

Figure 3:
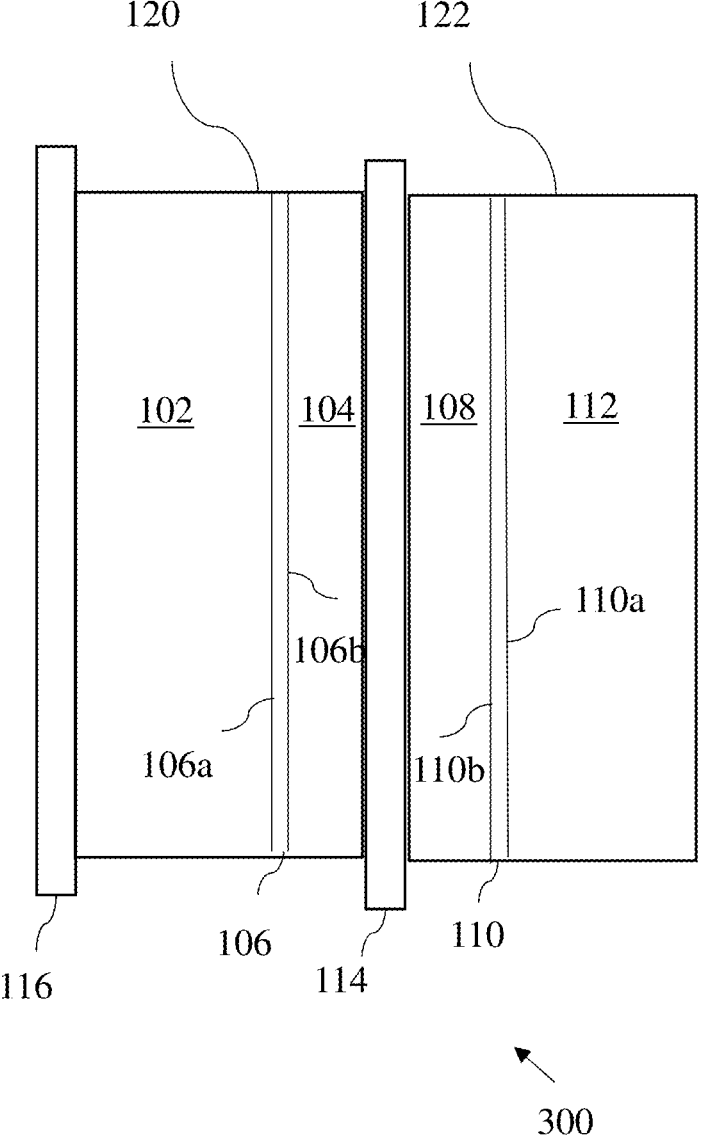
FIG. 3 illustrates a cross sectional view of an arrangement within the electrochemical cell of FIG. 1, according to an example embodiment of the present invention.

FIG. 3, discloses an arrangement 300 of the electrochemical cell 100, where a second porous separator 116 is disposed adjacent to one of the first side 106a of the cathode 120. As shown the second porous separator 116 touches the first composite layer 102 of the cathode 120.

Figure 4B:
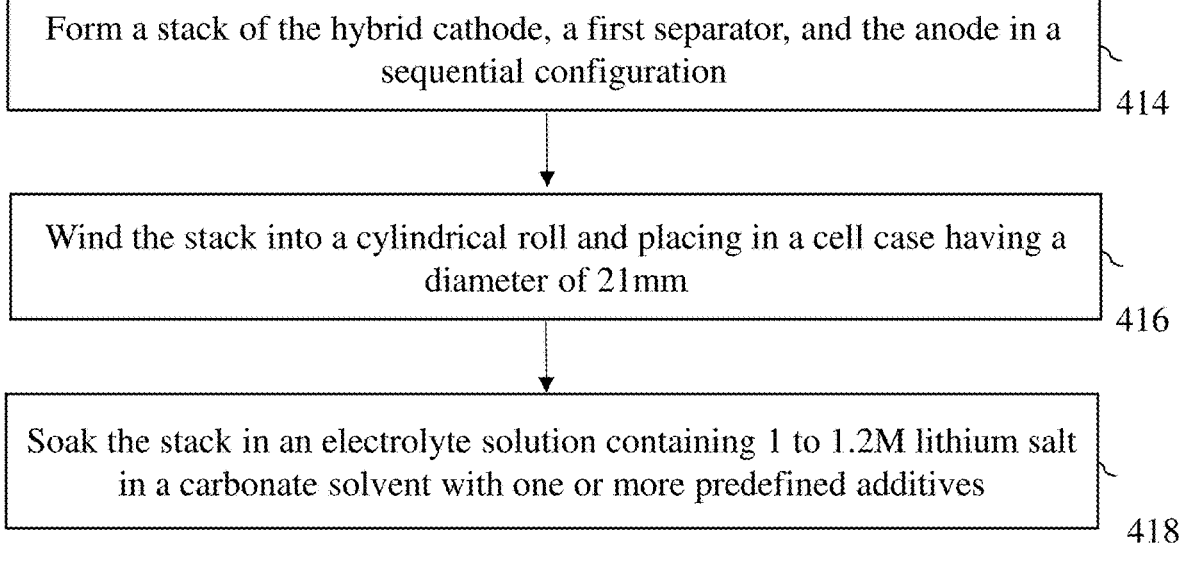
FIG. 4 is flowchart illustrating a method of manufacturing an electrochemical cell, according to an example embodiment.

FIGS. 4A and 4B is flowchart 400 illustrating a method of manufacturing an electrochemical cell, according to an example embodiment.

At 402, a first side of a cathode current collector is coated with a first composite active layer to form an energy side of the hybrid cathode.

At 404, a second side of the cathode current collector is coated with a hybrid active layer of form a power side of the hybrid cathode.

At 406, the hybrid cathode is dried under vacuum at a temperature ranging from 110 to 130 degree Celsius.

At 408, a first side of an anode current collector is coated with a second composite active layer to form an energy side of the anode.

At 410, a second side of the anode current collector is coated with a third composite active layer to form a power side of the anode.

At 412, the anode is dried under vacuum at a temperature of 110 to 130 degree Celsius. Typically, the hybrid cathode and the anode are dried prior to stacking the hybrid cathode and the anode along with a porous separator and a predefined electrolyte within the electrochemical cell.

At 414, a stack of the hybrid cathode, a first separator, and the anode is formed in a sequential configuration. In an embodiment, the sequential configuration includes the hybrid cathode, the first separator, the anode, a second separator. In another embodiment, the sequential configuration of the stack includes the second separator, hybrid cathode, the first separator, the anode. The first separator and the second separator comprises one of polypropylene (PP), polyethylene (PE), and a porous tri layer PP/PE/PP separator.

At 416, the stack is wound into a cylindrical roll and placing in a cell case having a diameter of 21 mm.

At 418, the stack is soaked in an electrolyte solution containing 1 to 1.2M lithium salt in a carbonate solvent with one or more predefined additives.

FIG. 5 is flowchart 500 illustrating a method of manufacturing a hybrid cathode of the electrochemical cell, according to an example embodiment.

At 502, 75 to 95% by mass of NMC 811, 5 to 20% by mass of a first conductive additive, and 5 to 20% by mass of a non-aqueous PVDF binder is mixed in a vacuum mixer for a predefined time duration of 6 to 12 hours, at a predefined temperature of 25 degree Celsius to obtain a first cathode slurry. The cathode slurry has a predefined viscosity ranging from 2000 mPa·s to 8000 mPa·s. In an embodiment, the first conductive additive comprises one or more of conductive carbon, SuperP, blended carbon, carbon fibers, carbon nanotubes (CNTs), carbon nanofibers (CNFs), porous carbon, ketjen black, carbon mixture. While in the disclosed embodiment, a non-aqueous PVDF binder is used, and NMC 811 electroactive material is used for making the first composite active layer, other forms of non-aqueous binders, and electroactive materials can also be used.

At 504, the first cathode slurry is deposited on the first side of the cathode current collector uniformly in a controlled environment to form a first composite active layer.

At 506, 60 to 95% by mass of NMC 811, 5 to 20% by mass of activated carbon, 5 to 20% of second conductive additive and 5 to 30% by mass of a non-aqueous PVDF binder solution are mixed together in a vacuum mixer for a predefined time duration of 6 to 12 hours, at a predefined temperature of 25 degree Celsius to obtain a second cathode slurry. The second cathode slurry has a predefined viscosity ranging from 2000 mPa·s to 8000 mPa·s.

At 508, the second cathode slurry is deposited on the second side of the cathode current collector uniformly in a controlled environment to form the hybrid active layer. The second conductive additive comprises one or more of conductive carbon, SuperP, blended carbon, carbon fibers, carbon nanotubes (CNTs), carbon nanofibers (CNFs), porous carbon, ketjen black, and carbon mixture.

At 510, the hybrid cathode is subjected to vacuum drying at a controlled temperature range of 110 to 130 degrees Celsius. This step is crucial for ensuring the complete removal of moisture and residual solvents from the hybrid active layer. By eliminating these impurities, the drying process enhances the integrity and stability of the cathode's structure. This, in turn, improves the electrochemical properties of the cathode, such as ionic conductivity and electron transport. Removing moisture and solvents minimizes the risk of parasitic reactions during the electrochemical processes, thereby preserving the cathode's capacity. This leads to a higher energy density, as the cathode can store and deliver more energy per unit mass. The optimized drying process enhances the cathode's conductivity and reaction kinetics. This enables the cell to deliver energy more rapidly, contributing to an improved power density, which is critical for applications requiring fast energy discharge.

FIG. 6 is flowchart 600 illustrating a method of manufacturing an anode of the electrochemical cell, according to an example embodiment.

At 602, 70 to 95% by mass, a third conductive additive in a range of 5 to 20% by mass, a third binder in a range of 5 to 20% by mass, in a vacuum mixer for a predefined time duration of 6 to 12 hours, at a predefined temperature of 25 to 35 degree Celsius to obtain a first anode slurry having a predefined viscosity ranging from 2000 mPa·s to 8000 mPa·s. Typically, the third conductive additive is one or more of conducting carbon, SuperP, graphene, and carbon nanotubes. The third binder comprises one or more of a non-aqueous Polyvinylidene Fluoride (PVDF) binder solution, Acrylonitrile-based binders, Polyethylene Oxide (PEO), and 5130 solvate, and wherein the one or more binders are dissolved in a N-Methyl-2-pyrrolidone (NMP) solvent at a concentration of 45 to 55% by weight to create a uniform binder solution.

At 604, the first anode slurry on the first side of the anode current collector uniformly in a controlled environment to form the second composite active layer.

At 606, 5 to 20% by mass of silicon, 80-95% by mass of graphite, 2.5 to 15% by mass of a fourth conductive additive, 2.5 to 15% by mass of a fourth binder and 2 to 8% of a solvent, are mixed in a vacuum mixer for a predefined time duration of 6 to 12 hours, in a controlled environment of temperature 25 to 35 degree Celsius to obtain a second anode slurry of predefined viscosity ranging from 2000 mPa·s to 8000 mPa·s. The fourth conductive additive is one or more of conducting carbon, SuperP, graphene, and carbon nanotubes. The fourth binder comprises of an aqueous binder selected from Carboxymethyl Cellulose (CMC), SBR, and Polyacrylic Acid (PAA); and the solvent is D-Ionized water.

At 608, the second anode slurry on the second side of the anode current collector uniformly in a controlled environment to form the third composite active layer.

At 610, the anode is dried under vacuum at a temperature of 110 to 130 degree Celsius. Vacuum drying the anode at a temperature range of 110 to 130 degrees Celsius serves multiple purposes in the manufacturing process of an electrochemical cell. This step helps remove any residual solvents or moisture from the anode materials, ensuring that the active layers, binders, and conductive additives are thoroughly dried. By applying a vacuum, the process reduces the boiling point of the solvent, allowing for effective evaporation at lower temperatures. This prevents the degradation of temperature-sensitive materials while ensuring the formation of a stable, dry, and uniform anode layer. The result is a well-prepared anode with improved electrochemical performance, contributing to higher energy and power densities in the final electrochemical cell. The controlled drying also enhances the structural integrity and longevity of the anode, making the cell more efficient and durable in its energy storage capabilities. In summary, vacuum drying at 110 to 130 degrees Celsius plays a pivotal role in maximizing both the energy density and power density of the electrochemical cell, making it suitable for high-performance energy storage systems.

Figure 7:
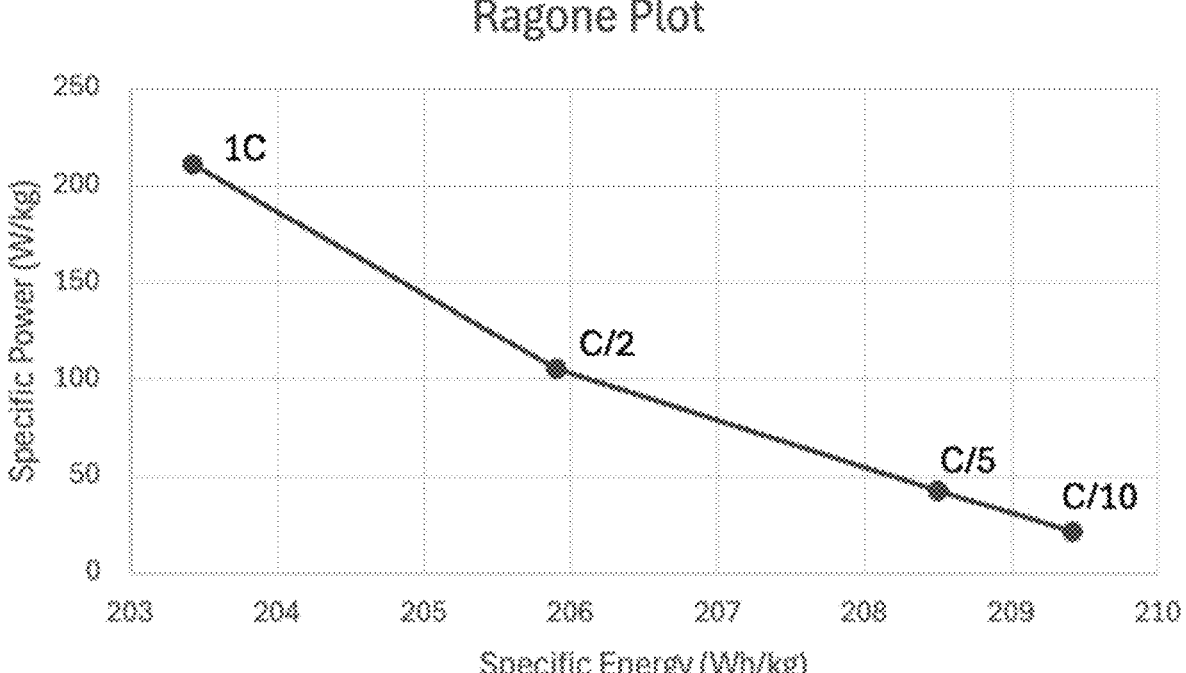
FIG. 7 is a Ragone plot graph illustrating variation of specific energy (Wh/kg) of the electrochemical cell versus a specific power (W/kg) of the electrochemical cell at lower charging (C) rates, according to an example embodiment.

FIG. 7 is a Ragone plot graph 700 illustrating variation of specific energy (Wh/kg) of the electrochemical cell versus a specific power (W/kg) of the electrochemical cell at lower charging (C) rates, according to an example embodiment.

The graph labeled "700" provides an analytical representation of the energy density (Wh/kg) versus power density (W/kg) of the cell under different discharging rates, ranging from 1 C to C/10. It demonstrates the fundamental relationship between these two critical performance metrics. At a discharging rate of 1 C, the energy density is measured at 203.43 Wh/kg, while the power density is 211.43 W/kg. This indicates that the cell can deliver a high rate of power with moderate energy retention, making it suitable for applications requiring quick bursts of energy. However, as the discharging rate decreases, a distinct pattern emerges: the energy density steadily increases, while the power density correspondingly diminishes.

For instance, at a discharging rate of C/2, the energy density increases to 205.90 Wh/kg, while the power density drops to 105.71 W/kg. This trend becomes even more pronounced at lower discharging rates. At C/5, the energy density is observed to be 208.50 Wh/kg, and the power density further decreases to 42.49 W/kg. At the lowest discharging rate, C/10, the energy density peaks at 209.42 Wh/kg, while the power density declines to 21.14 W/kg. This inverse relationship reflects the trade-off between the amount of energy the cell can store and deliver over time versus the rate at which it can deliver power. Higher discharging rates allow for faster energy delivery but at the cost of reduced overall energy storage efficiency. Conversely, slower discharging rates enable the cell to utilize its energy more effectively, enhancing energy density but reducing its capacity to deliver power rapidly.

The impact of this data is significant for understanding the cell's suitability for various applications. For high-power applications, such as electric vehicles or devices requiring immediate energy bursts, higher discharging rates (e.g., 1C) are advantageous despite slightly lower energy efficiency. On the other hand, applications requiring prolonged energy usage, such as backup power systems or low-drain devices, benefit from the higher energy densities achievable at lower discharging rates (e.g., C/10). This trade-off underscores the importance of matching the cell's discharging rate to the specific energy and power requirements of its intended application.

Additionally, the Table 1 below provides further insights into the cell's performance by showing its capacity values under various discharging rates (C, C/2, C/5, and C/10). As seen in the Table 1, at a discharging rate of C/10, the cell's capacity values measured over five tests are 4.183, 4.207, 4.111, 4.16 and 4.113. The consistency of these values reflects the cell's stability and reliability under low rate discharging conditions. The capacity values are key to understanding the overall efficiency and performance of the cell, indicating its ability to maintain consistent output over repeated cycles.

TABLE 1

| Cell No | C-level | Capacity Values | | | | |
|---|---|---|---|---|---|---|
| 1 | C/10 | 4.183 | 4.207 | 4.111 | 4.16 | 4.113 |
| 2 | C/5 | 4.112 | 4.132 | 4.076 | 4.105 | 4.06 |
| 3 | C/2 | 4.091 | 4.028 | 4.041 | 4.056 | 4.015 |
| 4 | C | 4.024 | 3.965 | 3.975 | 4.012 | 3.928 |

In summary, the graph and table collectively highlight the balance between energy and power density, demonstrating the performance characteristics of the cell across different discharging rates. This analysis emphasizes the need to tailor the cell's operational parameters to meet the energy and power demands of specific applications, ensuring both efficiency and effectiveness in its usage.

Figure 8:
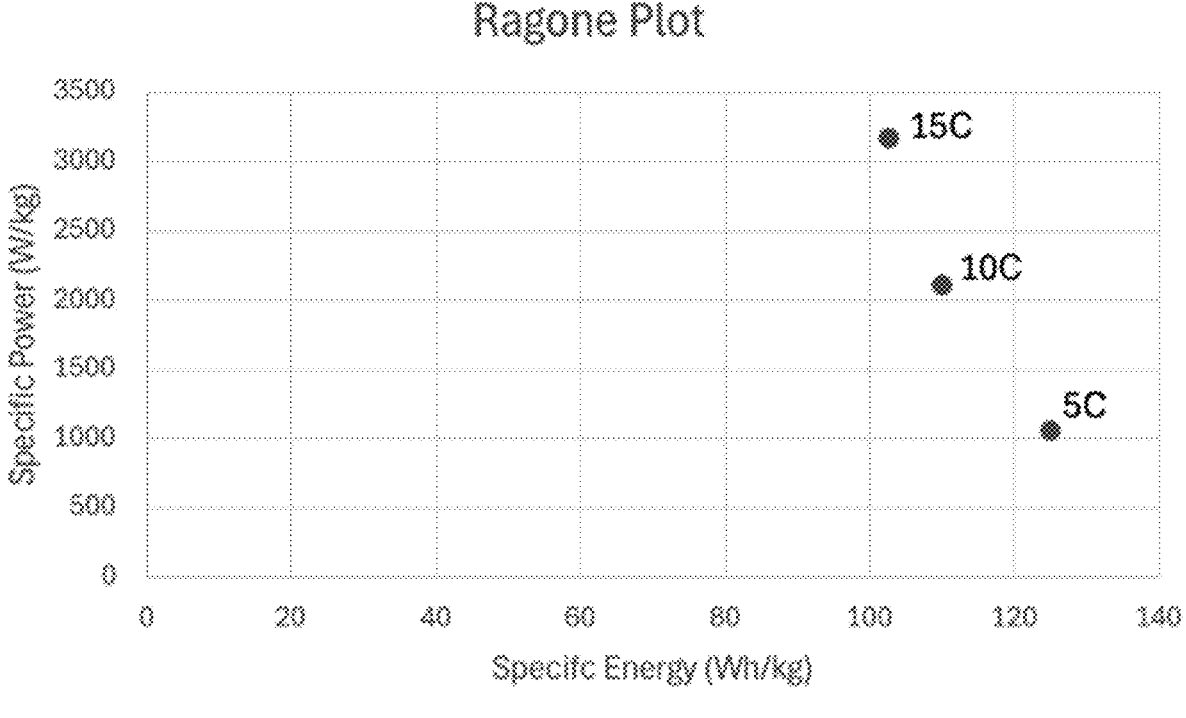
FIG. 8 is a Ragone plot graph illustrating variation of specific energy (Wh/kg) of the electrochemical cell versus a specific power (W/kg) of the electrochemical cell at higher charging (C) rates, according to an example embodiment.

FIG. 8 is a Ragone plot graph 800 illustrating variation of specific energy (Wh/kg) of the electrochemical cell versus a specific power (W/kg) of the electrochemical cell at higher charging (C) rates, according to an example embodiment. The graph labelled "800" provides a detailed analysis of the relationship between energy density (Wh/kg) and power density (W/kg) of the cell at higher discharging rates, ranging from 5 C to 20 C. This plot reveals a clear trend where, as the discharging rate increases, the energy density decreases significantly, while the power density increases substantially. At a discharging rate of 5 C, the cell exhibits an energy density of 125.00 Wh/kg and a power density of 1057.14 W/kg. This combination indicates that the cell can deliver a moderate amount of energy while providing a relatively high power output, making it suitable for applications requiring faster energy delivery without excessively compromising energy storage.

As the discharging rate increases to 10 C, the energy density decreases to 110.0 Wh/kg, whereas the power density nearly doubles to 2114.29 W/kg. This behaviour becomes even more pronounced at the highest tested rate of 15 C, where the energy density further declines to 102.5 Wh/kg, and the power density reaches an impressive 3171.42 W/kg. These results reflect the fundamental trade-off between energy and power output at higher discharging rates. The higher rates of discharge enable the cell to deliver power extremely quickly, making it ideal for high-demand, instantaneous power applications. However, this rapid discharge also reduces the total energy the cell can store and deliver over time, leading to a lower energy density.

The implications of this graph are significant for determining the cell's suitability for high-performance applications. At higher discharging rates, such as 10 C and 15 C, the cell's ability to deliver power increases drastically, which is advantageous for applications like high-powered machinery, advanced electric vehicles, or aerospace systems where bursts of energy are critical. However, the reduction in energy density means these applications must account for shorter operational durations, requiring more frequent recharging or larger battery packs to meet energy demands. Conversely, for applications prioritizing sustained energy delivery over prolonged periods, such high discharging rates may not be ideal due to the lower energy density and decreased efficiency.

The graph underscores the importance of understanding and balancing the trade-offs between energy and power density in designing and utilizing energy storage systems. It highlights the need to align the cell's discharge characteristics with the specific requirements of the intended application, optimizing its performance while ensuring the system's overall efficiency and reliability.

Figure 9:
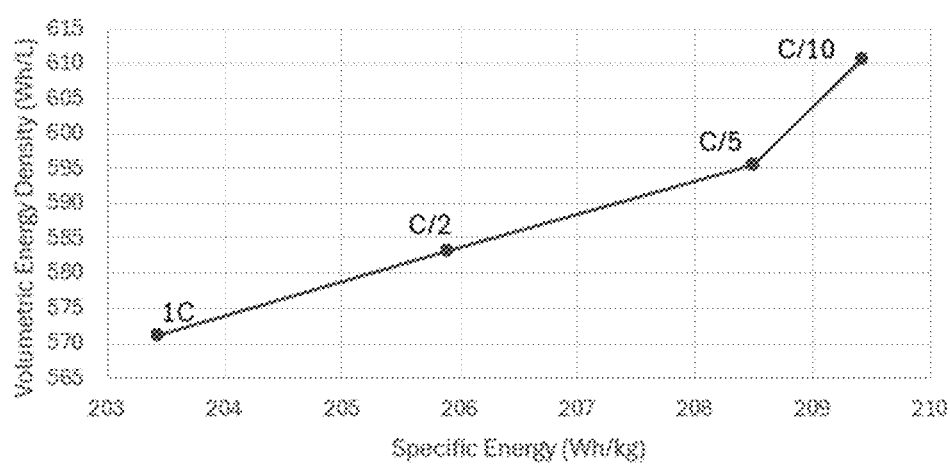
FIG. 9 is graphical representation of specific energy (Wh/kg) versus volumetric energy density (Wh/l) of the electrochemical cell, according to an example embodiment.

FIG. 9 is graphical representation 900 of specific energy (Wh/kg) versus volumetric energy density (Wh/l) of the electrochemical cell, according to an example embodiment. The graph labelled "900" provides a detailed representation of the relationship between specific energy (Wh/kg) and volumetric energy density (Wh/L) of the electrochemical cell at varying discharging rates, from C/10 to 1 C. This graphical analysis highlights the simultaneous decrease in both energy density and volumetric energy density as the discharging rate increases, emphasizing the trade-off between energy storage efficiency and the rate of energy delivery. At the lowest discharging rate of C/10, the cell achieves its maximum energy storage efficiency, with a specific energy of 209.42 Wh/kg and a volumetric energy density of 610.73 Wh/L. This indicates the cell's ability to store and deliver a large amount of energy in a compact form when discharged slowly, making it suitable for applications requiring sustained energy delivery over extended periods.

As the discharging rate increases, the specific energy and volumetric energy density decrease proportionally, demonstrating the impact of faster energy extraction on the cell's overall performance. For instance, at a C/5 discharging rate, the specific energy drops slightly to 208.50 Wh/kg, while the volumetric energy density decreases to 595.47 Wh/L. This trend continues at a C/2 discharging rate, where the specific energy further declines to 205.90 Wh/kg, and the volumetric energy density reduces to 583.25 Wh/L. At the highest discharging rate of 1 C, the specific energy is 203.43 Wh/kg, and the volumetric energy density is 571.04 Wh/L, representing the lowest energy storage efficiency among the measured rates.

This relationship underscores the influence of discharging rates on the cell's performance. Higher discharging rates enable faster energy delivery but result in decreased energy storage efficiency, both in terms of specific energy and volumetric energy density. The reduction in volumetric energy density at higher discharging rates also highlights the cell's decreased ability to store energy per unit volume, which can impact applications where space constraints are critical.

The graph demonstrates the importance of selecting an appropriate discharging rate to balance energy storage efficiency and power delivery based on the intended application. For scenarios prioritizing high energy storage and compactness, such as portable devices or backup power systems, slower discharging rates like C/10 are more advantageous. Conversely, for applications requiring rapid energy delivery, such as electric vehicles or power tools, higher discharging rates may be preferable despite the compromise on energy efficiency. This analysis emphasizes the need for tailored discharge strategies to optimize the cell's performance while meeting specific energy and volumetric density requirements in diverse operational contexts.

The disclosed electrochemical cell offers several advantages and addresses challenges present in the existing art. For instance, configuring the thickness ratio of the hybrid cathode to the anode as 6:5, combined with maintaining the ratio of the amount of active material within the hybrid cathode to the anode at 1:1.15, represents a strategic design approach for optimizing the energy and power performance of the cell. This carefully calibrated balance is instrumental in achieving key performance metrics, including an energy density of up to 210 Wh/kg, a volumetric energy density of up to 650 Wh/L, and a power density of up to 3.5 kW/kg.

The thickness ratio of the hybrid cathode to the anode at 6:5 ensures that the cathode and anode are proportionally designed to support efficient ion transport and charge transfer during the cell's operation. A slightly thicker cathode provides sufficient active material for lithium-ion intercalation or reaction, ensuring that the energy storage capacity is maximized. Meanwhile, a thinner anode relative to the cathode allows for faster electron transport, reducing internal resistance and contributing to higher power output. This ratio strikes a balance between the cathode's ability to store energy and the anode's capacity to efficiently deliver it during discharge.

Additionally, the ratio of the amount of active material in the cathode to the anode at 1:1.15 is finely tuned to optimize the cell's electrochemical reactions. By ensuring that the anode contains a slightly greater amount of active material than the cathode, the cell minimizes issues such as lithium plating on the anode surface, which can occur if the anode becomes a bottleneck for lithium-ion storage. This ratio promotes the uniform utilization of active materials in both electrodes, reducing capacity fade and enhancing the cell's cycle life. Furthermore, the careful alignment of these material quantities ensures that the cell operates efficiently without energy wastage, thereby improving the energy density (Wh/kg) and volumetric energy density (Wh/Litre).

The optimization achieved by these ratios directly impacts the cell's ability to deliver power (kW/kg). A well-matched cathode-anode configuration allows for high current flow with minimal resistance, supporting rapid energy delivery without compromising the overall energy storage capability. This is particularly critical in applications requiring both high energy density and power density, such as electric vehicles, portable electronics, and grid-scale energy storage systems.

In conclusion, configuring the thickness ratio of the hybrid cathode to the anode as 6:5 and maintaining the active material ratio at 1:1.15 reflects a carefully engineered balance between energy and power optimization. This design ensures that the cell can achieve high energy density, substantial volumetric energy storage, and impressive power output, making it versatile for a wide range of high-performance applications while maintaining durability and efficiency.

The electrochemical cell 100 is engineered to deliver exceptional performance metrics, combining high energy density, volumetric energy density, and power density. The energy density of the cell 100 reaches up to 210 watt-hours per kilogram (Wh/kg), a critical parameter that defines the amount of energy the cell 100 can store per unit of its weight. This high energy density is particularly advantageous for applications where weight is a significant constraint, such as in electric vehicles (EVs) and portable electronic devices. By maximizing the energy density, the cell 100 ensures extended operation times without the need for frequent recharging, enhancing the practicality and efficiency of energy storage systems.

In addition to energy density, the volumetric energy density of the cell 100 is optimized to reach up to 650 Watt-hours per Liter (Wh/L). This parameter measures the amount of energy stored per unit volume, making it a vital consideration for applications where space is limited, such as in consumer electronics or compact battery modules. High volumetric energy density allows for the development of smaller, lightweight devices without compromising on performance. This optimization is achieved through meticulous design of the electrode architecture, the choice of active materials, and the precise formulation of the electrolyte.

Furthermore, the electrochemical cell 100 achieves a remarkable power density of up to 3.5 kilowatts per kilogram (kW/kg). Power density quantifies the ability of the cell 100 to deliver energy quickly, which is crucial for high-power applications such as acceleration in electric vehicles or powering industrial equipment. The high power density is facilitated by the inclusion of advanced conductive additives like blended carbon and activated carbon, which accelerate electron transport within the electrodes. The hybrid cathode 120 and anode structures, with distinct energy and power sides, contribute to this performance by ensuring rapid charge and discharge cycles.

Together, these parameters highlight the versatility and efficiency of the electrochemical cell. The combination of high energy density, volumetric energy density, and power density makes it suitable for a wide range of applications, from consumer electronics to renewable energy storage and electric mobility solutions. This balance of energy storage capacity and rapid energy delivery positions the cell as a cutting-edge solution in modern energy storage technologies.

By addressing critical parameters such as material composition, viscosity control, drying techniques, and calendaring, this invention significantly enhances the efficiency, reliability, and longevity of electrochemical cells. It represents a valuable breakthrough in battery technology, offering scalable solutions for next-generation energy storage systems.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in a different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the example embodiments described are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

We claim:

1. An electrochemical cell, comprising:

a cathode comprising a cathode current collector, wherein a first side of the cathode current collector is coated with a first composite active layer, and a second side of the cathode current collector is coated with a hybrid active layer, wherein the first composite active layer comprises a cathode electroactive material in a range of 75 to 96% by mass, a first conductive additive in a range of 5 to 20% by mass, and a first non-aqueous binder in a range of 5 to 20% by mass, wherein the hybrid active layer comprises the cathode electroactive material in a range of 60 to 95% by mass, a cathode capacitive material in a range of 5 to 20% by mass, a second conductive additive in a range of 5 to 20% by mass, and a second non-aqueous binder in a range of 5 to 30% by mass;

an anode comprising an anode current collector, wherein a first side of the anode current collector is coated with a second composite active layer, and a second side of the anode current collector is coated with a third composite active layer, wherein the second composite active layer comprises graphite in a range of 70 to 95% by mass as an anode electroactive material, a third conductive additive in a range of 5 to 20% by mass, a third binder in a range of 5 to 20% by mass, wherein the third composite active layer comprises silicon in a range of 5 to 20% by mass and graphite in a range of 80 to 95% by mass as electroactive materials, a fourth conductive additive in a range of 2.5 to 15% by mass, a fourth binder in a range of 2.5 to 15% by mass, and a solvent in a range of 2 to 8% by mass, wherein each of the third conductive additive and the fourth conductive additive comprises one or more of conductive carbon, super P, blended carbon, graphene, carbon fibers, carbon nanotubes, carbon nanofibers, porous carbon, ketjen black, carbon mixture, wherein the third binder comprises one or more of a non-aqueous polyvinylidene fluoride binder solution, acrylonitrile-based binders, polyethylene oxide, and 5130 solvate, and wherein the one or more binders are dissolved in a n-methyl-2-pyrrolidone solvent at a concentration of 45 to 55% by weight to create a uniform binder solution, wherein the fourth binder comprises an aqueous binder selected from carboxymethyl cellulose, styrene-butadiene rubber, and polyacrylic acid, wherein the solvent is deionized water;

a porous separator arranged between the cathode and the anode, wherein the porous separator is adjacent to the hybrid active layer and the third composite active layer; and an electrolyte solution that flows through the porous separator;

wherein a ratio of thickness of the cathode to thickness of the anode is 6:5, wherein a ratio of thickness of the first side of the cathode to thickness of the second side of the cathode is 6:5 and wherein a ratio of thickness of the first side of the anode to thickness of the second side of the anode is 6:5, and wherein a ratio of amount of electroactive material within the cathode to amount of electroactive material within the anode is 1:1.15.

2. The electrochemical cell of claim 1, further comprising:

a second porous separator disposed adjacent to one of the first side of the cathode and the first side of the anode, and wherein the porous separator and the second porous separator are one of polypropylene (PP), polyethylene (PE), or a tri layered (PP,PE,PP) separator.

3. The electrochemical cell of claim 1, wherein the cathode electroactive material comprises one or more of nickel-manganese-cobalt oxide, lithium nickel cobalt aluminum oxide, lithium manganese iron phosphate, lithium ferro phosphate, lithium cobalt dioxide, lithium nickel manganese cobalt oxide, lithium nickel manganese aluminum oxide, lithium nickel manganese oxide, lithium manganese oxide, lithium nickel manganese oxide, lithium iron phosphate, lithium vanadium phosphate, lithium titanium sulfide, lithium sulfide, lithium iron phosphate fluoride, lithium iron phosphate polyphosphate, lithium vanadium phosphate fluoride, and lithium iron sulfide;

wherein the cathode capacitive material comprises at least one of activated carbon, electric double-layer capacitor materials, and pseudocapacitor materials;

wherein each of the first conductive additive and the second conductive additive comprises one or more of conductive carbon, super P, blended carbon, carbon fibers, carbon nanotubes, carbon nanofibers, porous carbon, ketjen black, carbon mixture, wherein the first conductive additive differs from the second conductive additive; and wherein each of the first non-aqueous binder and the second non-aqueous binder comprises one of a non-aqueous polyvinylidene fluoride binder solution, acrylonitrile-based binders, polyethylene oxide, or 5130 solvate, and wherein the first non-aqueous binder and the second non-aqueous binder are paired separately with a n-methyl-2-pyrrolidone solvent.

4. The electrochemical cell of claim 1, wherein the electrolyte solution comprises:

one or more of a lithium salt, an additive and a solvent, wherein the lithium salt is selected from lithium hexafluorophosphate, lithium tetrafluoroborate, lithium perchlorate, lithium hexafluoro arsenate, lithium bis (trifluoro methane) sulfonimide and is in a proportion of 1 to 2 moles per liter of the electrolyte solution; and wherein the additive is selected from vinylene carbonate, fluoroethylene carbonate, vinylene carbonate phosphates, borates; and wherein the solvent is selected from one of ethylene carbonate, propylene carbonate, dimethyl carbonate, diethyl carbonate, ethyl methyl carbonate, propylene carbonate, nitrile-based solvents such as acetonitrile, adiponitrile and ethers, lactones, sulfolanes, and combinations thereof.

5. The electrochemical cell of claim 1, wherein the energy density of the electrochemical cell is up to 210 watt-hours per kilogram (Wh/kg), the volumetric energy density is up to 650 watt-hours per liter (Wh/l), and the power density is up to 3.5 kilowatts per kilogram (kW/kg).

6. A method of manufacturing an electrochemical cell, the method comprising:

forming a hybrid cathode of the electrochemical cell by:

coating a first side of a cathode current collector with a first composite active layer to form an energy side of the hybrid cathode, wherein the first composite active layer is prepared by:

mixing a cathode electroactive material in a range of 75 to 96% by mass, a first conductive additive in a range of 5 to 20% by mass, and a first non-aqueous binder in a range of 5 to 20% by mass in a vacuum mixer for a predefined time duration of 6 to 12 hours, at a predefined temperature of 25 degree Celsius to obtain a first cathode slurry having a predefined viscosity ranging from 2000 mPa·s to 8000 mPa·s; and depositing the first cathode slurry on the first side of the cathode current collector uniformly in a controlled environment to form the first composite active layer;

coating a second side of the cathode current collector with a hybrid active layer of form a power side of the hybrid cathode, wherein the hybrid active layer is prepared by:

mixing the cathode electroactive material in a range of 60 to 95% by mass, a cathode capacitive material in a range of 5 to 20% by mass, a second conductive additive in a range of 5 to 20% and a second non-aqueous binder solution in a range of 5 to 30% by mass in a vacuum mixer for a predefined time duration of 6 to 12 hours, at a predefined temperature of 25 degree Celsius to obtain a second cathode slurry of predefined viscosity ranging from 2000 mPa·s to 8000 mPa·s; and depositing the second cathode slurry on the second side of the cathode current collector uniformly in a controlled environment to form the hybrid active layer; and drying the hybrid cathode under vacuum at a temperature of 110 to 130 degree Celsius;

forming an anode of the electrochemical cell by:

coating a first side of an anode current collector with a second composite active layer to form an energy side of the anode, wherein the second composite active layer is prepared by:

mixing graphite in a range of 70 to 95% by mass, a third conductive additive in a range of 5 to 20% by mass, a third binder in a range of 5 to 20% by mass, in a vacuum mixer for a predefined time duration of 6 to 12 hours, at a predefined temperature of 25 to 35 degree Celsius to obtain a first anode slurry having a predefined viscosity ranging from 2000 mPa·s to 8000 mPa·s; and depositing the first anode slurry on the first side of the anode current collector uniformly in a controlled environment to form the second composite active layer;

coating a second side of the anode current collector with a third composite active layer to form a power side of the anode, wherein the third composite active layer is prepared by:

mixing silicon in a range of 5 to 20% by mass, graphite in a range of 80-95% by mass, a fourth conductive additive in a range of 2.5 to 15% by mass, a fourth binder in a range of 2.5 to 15% by mass and a solvent in a range of 2 to 8%, in a vacuum mixer for a predefined time duration of 6 to 12 hours, in a controlled environment of temperature 25 to 35 degree Celsius to obtain a second anode slurry of predefined viscosity ranging from 2000 mPa·s to 8000 mPa·s; and depositing the second anode slurry on the second side of the anode current collector uniformly in a controlled environment to form the third composite active layer; and drying the anode under vacuum at a temperature of 110 to 130 degree Celsius, wherein the drying of the hybrid cathode and the anode is performed prior to stacking the hybrid cathode and the anode along with a porous separator and an electrolyte solution within the electrochemical cell, wherein the porous separator is arranged between the cathode and the anode, wherein the porous separator is adjacent to the hybrid active layer and the third composite active layer, wherein a ratio of thickness of the cathode to thickness of the anode is 6:5, wherein a ratio of thickness of the first side of the cathode to thickness of the second side of the cathode is 6:5 and wherein a ratio of thickness of the first side of the anode to thickness of the second side of the anode is 6:5, and wherein a ratio of amount of electroactive material within the cathode to amount of electroactive material within the anode is 1:1.15, wherein each of the third conductive additive and the fourth conductive additive comprises one or more of conductive carbon, super P, blended carbon, graphene, carbon fibers, carbon nanotubes, carbon nanofibers, porous carbon, ketjen black, carbon mixture, wherein the third binder comprises one or more of a non-aqueous polyvinylidene fluoride binder solution, acrylonitrile-based binders, polyethylene oxide, and 5130 solvate, and wherein the one or more binders are dissolved in a n-methyl-2-pyrrolidone solvent at a concentration of 45 to 55% by weight to create a uniform binder solution, wherein the fourth binder comprises an aqueous binder selected from carboxymethyl cellulose, styrene-butadiene rubber, and polyacrylic acid, wherein the solvent is deionized water.

7. The method of claim 6, wherein the cathode electroactive material comprises one or more of nickel-manganese-cobalt oxide, lithium nickel cobalt aluminum oxide, lithium manganese iron phosphate, lithium ferro phosphate, lithium cobalt dioxide, lithium nickel manganese cobalt oxide, lithium nickel manganese aluminum oxide, lithium nickel manganese oxide, lithium manganese oxide, lithium nickel manganese oxide, lithium iron phosphate, lithium vanadium phosphate, lithium titanium sulfide, lithium sulfide, lithium iron phosphate fluoride, lithium iron phosphate polyphosphate, lithium vanadium phosphate fluoride, and lithium iron sulfide;

wherein the cathode capacitive material comprises at least one of activated carbon, electric double-layer capacitor materials, and pseudocapacitor materials; and wherein each of the first conductive additive and the second conductive additive comprises one or more of conductive carbon, super P, blended carbon, carbon fibres, carbon nanotubes, carbon nanofibers, porous carbon, ketjen black, carbon mixture.

8. The method of claim 6, further comprising:

forming a stack of the hybrid cathode, a first separator, a second separator, and the anode in a sequential configuration consisting of one of:

(a) the hybrid cathode, the first separator, the anode, the second separator; and (b) the second separator, hybrid cathode, the first separator, the anode;

wherein the first separator and the second separator comprises one of polypropylene (PP), polyethylene (PE), and a porous tri layer PP/PE/PP separator;

winding the stack into a cylindrical roll and placing in a cell case having a diameter of 21 mm; and soaking the stack in an electrolyte solution containing 1 to 1.2M lithium salt in a carbonate solvent with one or more predefined additives.

9. The method of claim 6, wherein the electrolyte solution is manufactured by:

dissolving 1-2M lithium hexafluorophosphate in a solvent mixture selected from ethylene carbonate/propylene carbonate, ethylene carbonate/dimethyl carbonate, ethylene carbonate/diethyl carbonate, ethylene carbonate/propylene carbonate/dimethyl carbonate, or their combinations in a binary ratio of 1:1 v/v % or ternary ratio of 1:1:1 to 1:1:3 v/v %; and adding 1-10% by weight of the predefined additives into the solvent mixture, wherein the predefined additives are selected from one or more vinylene carbonate, fluoroethylene carbonate.

10. The method of claim 6, wherein the electrochemical cell achieves an energy density of up to 210 Wh/kg, a volumetric energy density of up to 650 Wh/l, and a power density of up to 3.5 kW/kg for the electrochemical cell.

\* \* \* \* \*